(No Model.)
D. A. CAMERON.
PILLOW BLOCK.
No. 394,056. Patented Dec. 4, 1888.
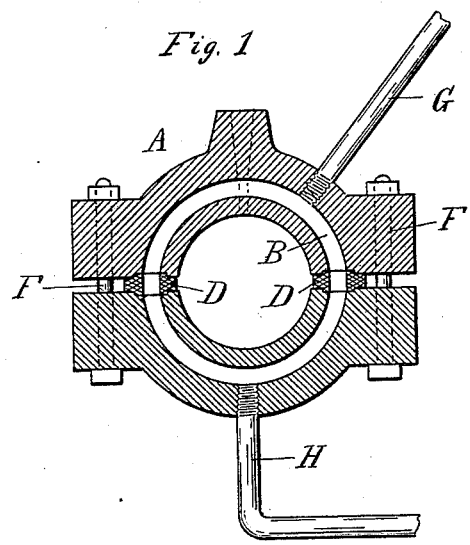
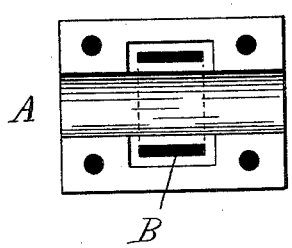
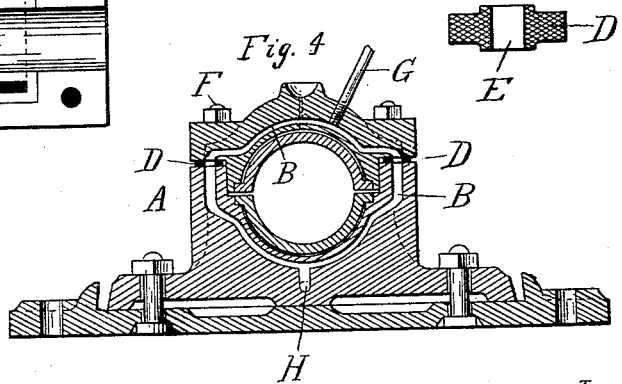
Witnesses:
P. M. Hulbert.
John Schuman.
Inventor:
Daniel A. Cameron
By Thos. S. Sprague & Son
Att'y.

UNITED STATES PATENT OFFICE.

DANIEL A. CAMERON, OF PORT HURON, MICHIGAN.

PILLOW-BLOCK.

SPECIFICATION forming part of Letters Patent No. 394,056, dated December 4, 1888.

Application filed February 23, 1888. Serial No. 265,004. (No model.)

*To all whom it may concern:*

Be it known that I, DANIEL A. CAMERON, a citizen of the United States, residing at Port Huron, in the county of St. Clair and State of Michigan, have invented certain new and useful Improvements in Pillow-Blocks, of which the following is a specification, reference being had therein to the accompanying drawings.

This invention relates to certain new and useful improvements in pillow blocks or boxes; and the invention consists in the arrangement and operation of the devices by means of which the trouble, annoyance, and danger from hot boxes are almost entirely overcome by means of a circulation of a cooling medium established through the pillow blocks or boxes, all as more fully hereinafter described.

In the drawings which accompany this specification, Figure 1 is a vertical cross-section of a journal-box embodying my invention. Fig. 2 is a plan of one-half of the pillow-block, Fig. 3 is a detached section of the compressible gasket, and Fig. 4 is a vertical cross-section of a pillow-block.

A represents the upper and lower parts of a pillow-block, which may be of any suitable construction, except as hereinafter described.

B is an annular chamber cast in each part of the pillow-block, preferably in the form of a ring, concentric with the center of the bearing, and in close proximity to the inner walls thereof.

D is a gasket made of any kind of soft metal, or preferably of rubber. This gasket is provided with a central aperture, E, adapted to establish connection between the upper and lower halves of the chamber B in the journal-bearing, and at the same time to fit between the upper and lower halves of the journal-bearings and permit of adjusting the bearing in the ordinary manner by means of the bolts F as the brasses or Babbitt wears away. This gasket is preferably seated in sockets, or otherwise prevented from accidental displacement, and is intended to form a tight joint between the upper and lower halves of the box or bearing. I deem it important that the gasket be seated in sockets, as shown, for this construction prevents displacement of the gasket and keeps the aperture in the gasket in line with the annular chamber.

G and H are ingoing and outgoing connections, respectively, for admitting a cooling medium—such as cold water—into the chamber B, and permitting it to circulate through by causing it to flow off through the pipe H. It is immaterial, however, how the pipes are connected to the pillow-block, as this depends upon the contingencies of construction; but I preferably secure the in and out going pipes in such relation to each other as to cause a circulation at the lowest point to permit the water or other cooling medium in the journal-box to be drained off to prevent freezing.

As there are a large number of pillow-blocks or journal-bearings in any plant of machinery, I intend to connect all the boxes to be thus guarded against becoming hot into a system which may be then connected with a tank or any other source of supply—if nothing better, even with the boiler or feed-water heater, as it will be seen that the heat of boiling water or steam is sufficiently low to form a cooling medium to prevent the boxes from becoming overheated, and thereby avoid the danger or liability of setting fire to a valuable plant. Instead of using water as the cooling medium, steam, air, or other fluid may be used. I have in view also to apply my invention to the boxes of vehicles of any kind—such as railway-cars, which are especially liable to suffer from hot boxes—in which case a suitable supply of cooling medium has to be provided from a receptacle or from the tender or locomotive of the train.

What I claim as my invention is—

1. A pillow-block formed with an annular chamber and sockets, as described, combined with compressible gaskets seated in said sockets and having apertures coincident with said annular chamber, substantially as and for the purpose specified.

2. A pillow-block formed of two parts, each part provided with an annular chamber concentric to the center of the bearing, and with sockets upon each side of said chamber, combined with compressible gaskets between the two parts of the block seated in said sockets and provided with aperture E, coincident with the annular chambers therein, the bolts F, adjustably securing the two parts together, and the inlet and outlet connections communicating with the annular chamber, substantially as and for the purpose specified.

In testimony whereof I affix my signature, in presence of two witnesses, this 9th day of February, 1888.

DANIEL A. CAMERON.

Witnesses:
P. M. HULBERT,
JOHN SCHUMAN.